(12) United States Patent
Vallance et al.

(10) Patent No.: US 12,422,629 B2
(45) Date of Patent: Sep. 23, 2025

(54) OPTICAL CONNECTION OF OPTICAL FIBERS TO GRATING COUPLERS

(71) Applicant: SENKO ADVANCED COMPONENTS, INC., Hudson, MA (US)

(72) Inventors: Robert Ryan Vallance, Newbury Park, CA (US); Shuhe Li, Pasadena, CA (US); Rand D. Dannenberg, Newbury Park, CA (US); Michael K. Barnoski, Pacific Palisades, CA (US)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 17/203,565

(22) Filed: Mar. 16, 2021

(65) Prior Publication Data

US 2022/0026649 A1    Jan. 27, 2022

Related U.S. Application Data (63) Continuation of application No. 16/388,741, filed on Apr. 18, 2019, now abandoned, which is a
(Continued)

(51) Int. Cl.
*G02B 6/42* (2006.01)
*G02B 6/124* (2006.01)
(Continued)

(52) U.S. Cl.
CPC ........... *G02B 6/4214* (2013.01); *G02B 6/124* (2013.01); *G02B 6/14* (2013.01); *G02B 6/305* (2013.01);
(Continued)

(58) Field of Classification Search
CPC ........ G02B 6/4214; G02B 6/124; G02B 6/14; G02B 6/305; G02B 6/4248; G02B 6/4249; G02B 6/3838
See application file for complete search history.

(56) References Cited

U.S. PATENT DOCUMENTS

| 4,411,057 A | 10/1983 | Duda et al. |
| 5,611,014 A | 3/1997 | Basavanhally |

(Continued)

FOREIGN PATENT DOCUMENTS

| JP | S63228107 | 9/1988 |
| JP | H11502633 | 3/1999 |

(Continued)

OTHER PUBLICATIONS

International Search Report of Counterpart PCT International Application No. PCT/US2015/031261.

*Primary Examiner* — Uyen Chau N Le
*Assistant Examiner* — Hoang Q Tran (57) ABSTRACT

To couple light between an optical fiber and a grating coupler of a photonic integrated circuits, a mirror is provided to turn light to/from the optical fiber to allow the axis of the optical fiber to be oriented at small angles or parallel to the surface of the PIC, and lowered close to the surface of the PIC. The mirror is further configured to reshape light from a flat polished optical fiber to produce a mode field resembling the mode field of an angled polished optical fiber, to match the design angle of existing grating couplers that are designed to work with angled polished optical fibers. The mirror and optical fiber alignment structure in the optical connector are integrally/simultaneous formed by precision stamping.

20 Claims, 3 Drawing Sheets

Related U.S. Application Data continuation of application No. 14/714,247, filed on May 15, 2015, now abandoned, which is a continuation-in-part of application No. 14/695,008, filed on Apr. 23, 2015, now abandoned, which is a continuation-in-part of application No. 13/861,273, filed on Apr. 11, 2013, now abandoned, which is a continuation-in-part of application No. 13/786,448, filed on Mar. 5, 2013, now abandoned.

(60) Provisional application No. 61/994,089, filed on May 15, 2014, provisional application No. 61/699,125, filed on Sep. 10, 2012, provisional application No. 61/623,027, filed on Apr. 11, 2012, provisional application No. 61/606,885, filed on Mar. 5, 2012.

(51) Int. Cl.
  *G02B 6/14* (2006.01)
  *G02B 6/30* (2006.01)
  *G02B 6/32* (2006.01)
  *G02B 6/34* (2006.01)
  *G02B 6/38* (2006.01)

(52) U.S. Cl.
  CPC ............. *G02B 6/32* (2013.01); *G02B 6/34* (2013.01); *G02B 6/3838* (2013.01); *G02B 6/4248* (2013.01); *G02B 6/4249* (2013.01); *Y10T 29/49* (2015.01); *Y10T 29/49119* (2015.01)

(56) References Cited

U.S. PATENT DOCUMENTS

| | | | |
|---|---|---|---|
| 5,987,202 A | 11/1999 | Gruenwald et al. | |
| 6,062,741 A | 5/2000 | Tachigori | |
| 6,213,650 B1 * | 4/2001 | Moriyama | G02B 6/4214 385/94 |
| 6,402,394 B1 * | 6/2002 | Heinrich | G02B 6/4246 385/88 |
| 7,245,803 B2 | 7/2007 | Gunn, III et al. | |
| 9,011,025 B2 | 4/2015 | McColloch | |
| 9,435,959 B2 | 9/2016 | Doerr et al. | |
| 2002/0096686 A1 * | 7/2002 | Raj | G02B 6/4214 257/79 |
| 2003/0138223 A1 | 7/2003 | Sasaki et al. | |
| 2005/0053112 A1 * | 3/2005 | Shams-Zadeh-Amiri | H01S 5/187 372/102 |
| 2006/0233497 A1 * | 10/2006 | Hoshino | G02B 6/423 385/88 |
| 2006/0239612 A1 | 10/2006 | De Dobbelaere et al. | |
| 2008/0129985 A1 * | 6/2008 | Laffont | G02B 6/124 356/128 |
| 2010/0006784 A1 | 1/2010 | Mack et al. | |
| 2011/0133063 A1 | 6/2011 | Ji et al. | |
| 2011/0142395 A1 * | 6/2011 | Fortusini | G02B 6/34 385/37 |
| 2012/0183256 A1 * | 7/2012 | Shao | G02B 6/4292 385/39 |
| 2013/0209026 A1 | 8/2013 | Doany et al. | |
| 2013/0322818 A1 | 12/2013 | Li et al. | |
| 2014/0029894 A1 | 1/2014 | Bowen | |
| 2014/0233891 A1 * | 8/2014 | Pottier | G02B 6/12007 359/570 |
| 2015/0309261 A1 | 10/2015 | Kobyakov et al. | |

FOREIGN PATENT DOCUMENTS

| | | | |
|---|---|---|---|
| JP | 2005037642 | 2/2005 | |
| JP | 2007121938 | 5/2007 | |
| WO | WO-2004001485 A1 * | 12/2003 | ......... G02B 6/29307 |

* cited by examiner

OPTICAL CONNECTION OF OPTICAL FIBERS TO GRATING COUPLERS

BACKGROUND OF THE INVENTION

1. Priority Claim

This application is a continuation of U.S. patent application Ser. No. 16/388,741 filed on Apr. 18, 2019, which is a continuation of U.S. patent application Ser. No. 14/714,247 filed on May 15, 2015, which (1) claims the priority of U.S. Provisional Patent Application No. 61/994,089 filed on May 15, 2014, and (2) is a continuation-in-part of U.S. patent application Ser. No. 14/695,008 filed on Apr. 23, 2015, which is a continuation-in-part of U.S. patent application Ser. No. 13/861,273 filed on Apr. 11, 2013, which (a) claims the priority of U.S. Provisional Patent Application No. 61/623,027 filed on Apr. 11, 2012; (b) claims the priority of U.S. Provisional Patent Application No. 61/699,125 filed on Sep. 10, 2012; and (c) is a continuation-in-part of U.S. patent application Ser. No. 13/786,448 filed on Mar. 5, 2013, which claims the priority of U.S. Provisional Patent Application No. 61/606,885 filed on Mar. 5, 2012. These applications are fully incorporated by reference as if fully set forth herein. All publications noted below are fully incorporated by reference as if fully set forth herein.

GOVERNMENT RIGHTS

This invention was made with government support under Contract No. DE-SC0009617 awarded by Department of Energy. The government has certain rights in the invention.

2. Field of the Invention

The present invention relates to coupling of light into and out of photonic integrated circuits (PICs), and more particular to the optical connection of optical fibers to PICs.

3. Description of Related Art

A photonic integrated circuit (PIC) or integrated optical circuit is a device that integrates multiple (at least two) photonic functions and as such is analogous to an electronic integrated circuit. The major difference between the two is that a photonic integrated circuit provides functionality for information signals imposed on optical wavelengths typically in the visible spectrum or near infrared 850 nm-1650 nm.

PICs are used for various applications in telecommunications, instrumentation, and signal-processing fields. A PIC typically uses optical waveguides to implement and/or interconnect various on-chip components, such as waveguides, optical switches, couplers, routers, splitters, multiplexers/demultiplexers, modulators, amplifiers, wavelength converters, optical-to-electrical (O/E) and electrical-to-optical (E/O) signal converters (e.g., photodiodes, lasers), etc. A waveguide in a PIC is usually an on-chip solid light conductor that guides light due to an index-of-refraction contrast between the waveguide's core and cladding.

For proper operation, a PIC typically needs to efficiently couple light between an external optical fiber and one or more of on-chip waveguides. There are two fundamental but different approaches to couple light from optical fibers to PICs.

In the first method, the optical fiber is coupled to the edge of a PIC. This requires that the die be diced from the wafer and that the edge be polished prior to connection with the optical fiber. Consequently, the PICs cannot be tested on a wafer and must be packaged before determining whether a PIC is good or bad. This increases production cost for the PICs and requires stringent alignment tolerances between the optical fiber and the polished end of the waveguide.

Figure 1:
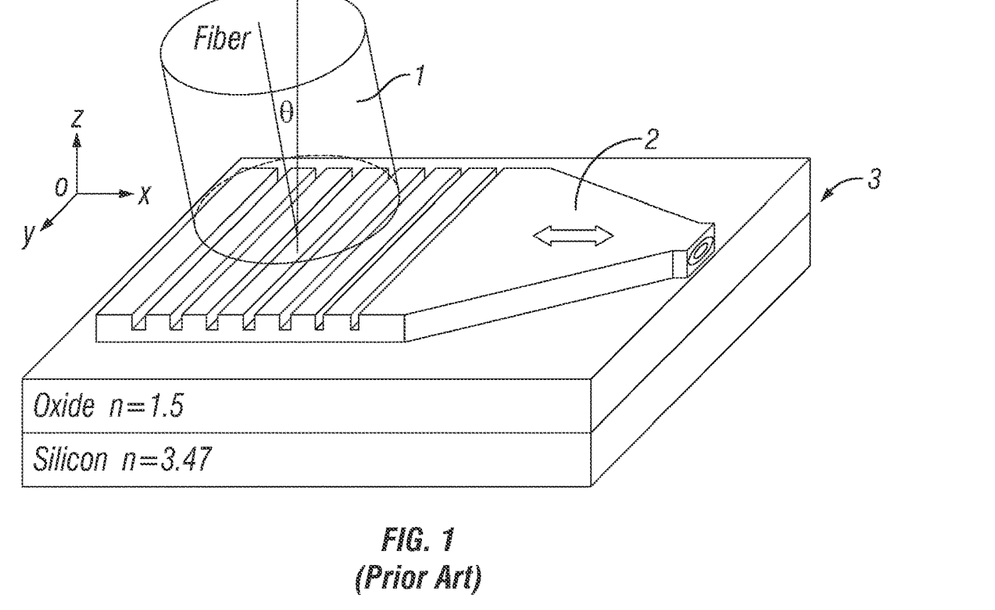
FIG. 1 is a schematic view of a prior art fiber to grating coupler connection.

In the second method, light from the optical fibers is coupled in/out of the PIC using diffractive grating couplers. In this case, the optical fibers are butt-coupled normal to the flat surface of the PIC and light exits/enters the PIC normal to the flat surface. As shown in FIG. 1, the prior art, the fiber 1 is butt-coupled to the grating coupler 2 on the surface of a silicon PIC 3. This means that the PICs can be tested prior to dicing using probers that incorporate electrical and fiber-optic probe-heads. This can lower the packaging costs of the PICs.

However, prior art using grating couplers has at least two major deficiencies. The first is that the optical fibers are generally terminated in quartz fiber arrays (optically transparent). The quartz fiber arrays position a linear array of optical fibers on standard pitch (e.g. 250 micrometers), but the tolerances are typically greater than 1 micrometer, which is not ideal for single-mode applications. Additionally, the quartz fiber arrays are expensive to manufacture since they are generally ground on CNC machine tools; consequently there is little cost savings with increased production volumes. Finally, the quartz fiber array and the bend radius of the optical fiber adds to the height of the packaged PIC. (The prior art optical coupling in FIG. 1 can be compared to the optical coupling of the inventive concept schematically illustrated in FIG. 2.)

Further, most grating couplers are designed to work with angled polished optical fibers (i.e., end face is at a plane not perpendicular to the fiber axis). This adds another level of complication to have to adopt angled polished optical fibers having a specific angled end face that produces a mode field that matches the design angle of the grating couplers.

What is needed is an improved approach to optically couple input/output of optical fibers to PICs, which improves tolerance, manufacturability, ease of use, functionality and reliability at reduced costs.

SUMMARY OF THE INVENTION

The present invention overcomes the drawbacks of the prior art by providing a novel approach to optical coupling between an optical fiber and a grating coupler of a photonic integrated circuit (PIC). In accordance with the present invention, a mirror is provided to turn light to/from the optical fiber to allow the axis of the optical fiber to be oriented at small angles or parallel to the surface of the PIC, and lowered close to the surface of the PIC. Consequently, the optical connector between the optical fiber and the coupler grating can be low-profile and fit into smaller transceiver packages.

In a further aspect of the present invention, the mirror is configured to reshape light to produce a mode field that matches the optical fiber input/output and the design angle of a target grating coupler. In one embodiment, the mirror is configured to reshape light input/output of a flat polished optical fiber (i.e., end face in a plane perpendicular to the fiber axis), to produce a mode field resembling the mode field of an angled polished optical fiber, so as to match the design angle of existing grating couplers that are designed to work with angled polished optical fibers.

The mirror and optical fiber alignment structure in the optical connector can be integrally/simultaneous formed by precision stamping, which allows the connector components to be produced economically in high or small volumes, while improving tolerance, manufacturability, ease of use, functionality and reliability.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention provides a novel approach to coupling light between an optical fiber and a grating coupler of a photonic integrated circuits (PIC). In accordance with the present invention, a mirror is provided to turn light to/from the optical fiber to allow the axis of the optical fiber to be oriented at small angles or parallel to the surface of the PIC, and lowered close to the surface of the PIC. Consequently, the optical connector between the optical fiber and the grating coupler can be low-profile and fit into smaller transceiver packages.

Figure 2:
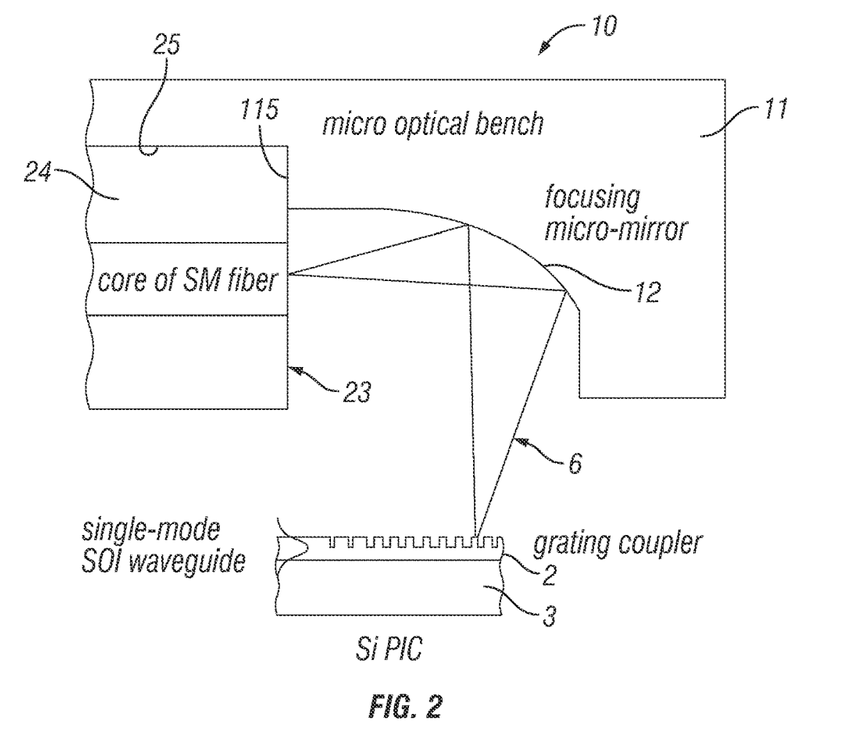
FIG. 2 is a schematic sectional view illustrating the inventive concept of a fiber to grating coupler connection in accordance with one embodiment of the present invention.

FIG. 2 schematically illustrates the inventive concept of the present invention. FIG. 2 schematically illustrates the sectional view of a micro optical bench 11 (MOB) in an optical coupling/connection device 10. The optical fiber 24 is supported on the optical bench 11, with its axis substantially parallel to the plane of the grating coupler 2 and the silicon PIC 3. FIG. 2 illustrates the optical bench 11 supporting the terminating end section of the optical fiber 24 in its bare form, having cladding exposed, without the protective buffer and jacket layers of an optical fiber cable (23 shown in FIG. 6). The optical bench 11 includes an optical fiber alignment structure in the form of a groove 25, and a structured reflective surface in the form of a focusing micro-mirror 12. The groove 25 positions and aligns the optical fiber 24 with respect to the mirror 12, along an intended, designed optical path 6 (the shape of the light path is schematically illustrated in FIG. 2). Part of the edge of the end face 115 of the optical fiber 24 is butted against a shoulder 5 provided at the end of the groove 25, which serves as a stop to define the position of the end face 115 with respect to the mirror 12. The groove 25 and the shoulder 5 precisely position and align the optical fiber 24 with respect to the structured reflective surfaces 12, with the end face 115 at a pre-defined distance from the mirror 12.

The mirror 12 has a structured reflective surface that is configured to turn the input/output of the optical fiber 24 with respect to the mirror 12, to couple light between the optical fiber and grating coupler 2. In the illustrated embodiment, the optical fiber 24 is single mode (SM) flat polished. The end face 115 of the optical fiber 24 is in a plane substantially perpendicular to its longitudinal axis.

Figure 6:
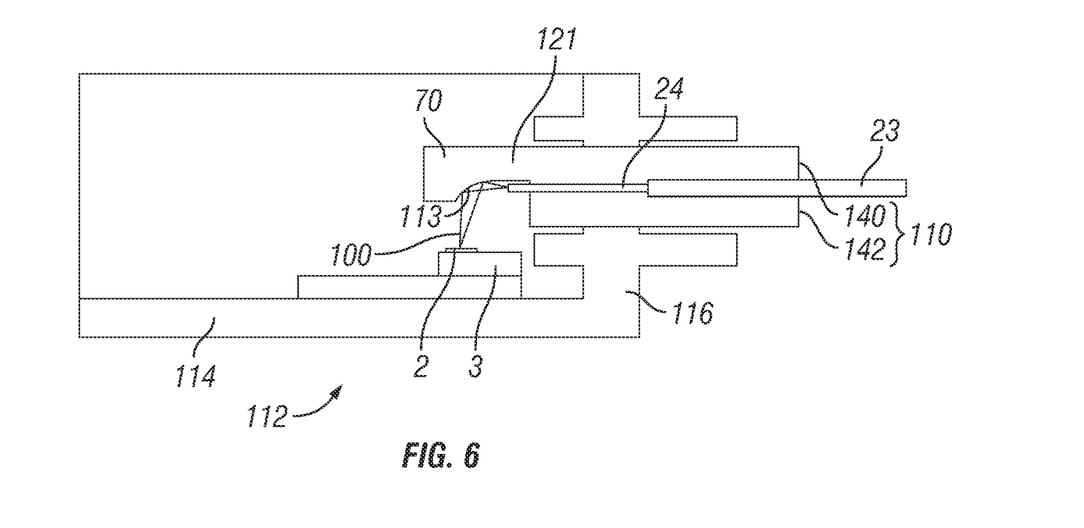
FIG. 6 is a sectional view illustrating reflection of light between optical fiber and a grating coupler on a PIC, in accordance with another embodiment of the present invention.

Comparing the structure shown in FIG. 2 to the prior art fiber to grating coupler connection shown in FIG. 1, it is clear that the inventive fiber to grating connection produces an overall significantly lower profile. The inventive connector provides easy means of placement of the optical bench in relation to the PIC, as illustrated in the embodiment of FIG. 6 which is discussed below.

In a further aspect of the present invention, the mirror/structured reflective surface and optical fiber alignment structure in the optical connector can be integrally/simultaneous formed by precision stamping of a stock material (e.g., a metal blank or strip), which allows the connector components to be produced economically in high or small volumes, while improving tolerance, manufacturability, ease of use, functionality and reliability. By forming the structure reflective surface and the optical fiber alignment structure simultaneously in a same, single final stamping operation, dimensional relationship of all features requiring alignment on the same work piece/part can be maintained in the final stamping step. Instead of a punching operation with a single strike of the punch to form all the features on the optical bench, it is conceivable that multiple strikes may be implemented to progressive pre-form certain features on the optical bench, with a final strike to simultaneously define the final dimensions, geometries and/or finishes of the various structured features on the optical bench, including the mirror, optical fiber alignment structure/groove, etc. that are required to ensure (or play significant role in ensuring) proper alignment of the respective components/structures along the design optical path.

The Assignee of the present invention, nanoPrecision Products, Inc., developed various proprietary optical coupling/connection devices having optical benches used in connection with optical data transmission. The present invention is more specifically directed to coupling optical fibers to grating couplers in PICs, while adopting similar concept of stamping optical benches including stamped mirrors practiced in the earlier optical coupling devices.

For example, US2013/0322818A1 discloses an optical coupling device having a stamped structured surface for routing optical data signals, in particular an optical coupling device for routing optical signals, including a base; a structured surface defined on the base, wherein the structured surface has a surface profile that reshapes and/or reflect an incident light; and an alignment structure defined on the base, configured with a surface feature to facilitate positioning an optical component on the base in optical alignment with the structured surface to allow light to be transmitted along a defined path between the structured surface and the optical component, wherein the structured surface and the alignment structure are integrally defined on the base by stamping a malleable material of the base.

US2013/0294732A1 further discloses a hermetic optical fiber alignment assembly having an integrated optical element, in particular a hermetic optical fiber alignment assembly including a ferrule portion having a plurality of grooves receiving the end sections of optical fibers, wherein the grooves define the location and orientation of the end sections with respect to the ferrule portion. The assembly includes an integrated optical element for coupling the input/output of an optical fiber to optoelectronic devices in an optoelectronic module. The optical element can be in the form of a structured reflective surface. The end of the optical fiber is at a defined distance to and aligned with the structured reflective surface. The structured reflective surfaces and the fiber alignment grooves can be formed by stamping.

U.S. patent application Ser. No. 14/695,008 further discloses an optical coupling device for routing optical signals for use in an optical communications module, in particular an optical coupling device in which defined on a base are a structured surface having a surface profile that reshapes and/or reflect an incident light, and an alignment structure defined on the base, configured with a surface feature to facilitate positioning an optical component on the base in optical alignment with the structured surface to allow light to be transmitted along a defined path between the structured surface and the optical component. The structured surface and the alignment structure are integrally defined on the base by stamping a malleable material of the base. The alignment structure facilitates passive alignment of the optical component on the base in optical alignment with the structured surface to allow light to be transmitted along a defined path between the structured surface and the optical component. The structured surface has a reflective surface profile, which reflects and/or reshape incident light.

U.S. Pat. No. 7,343,770 discloses a novel precision stamping system for manufacturing small tolerance parts. Such inventive stamping system can be implemented in various stamping processes to produce the devices disclosed in above-noted nanoPrecision patent documents, and can similarly be implemented to produce the structures disclosed herein. These stamping processes involve stamping a bulk material (e.g., a metal blank or stock), to form the final surface features at tight (i.e., small) tolerances, including the reflective surfaces having a desired geometry in precise alignment with the other defined surface features.

Figure 3:
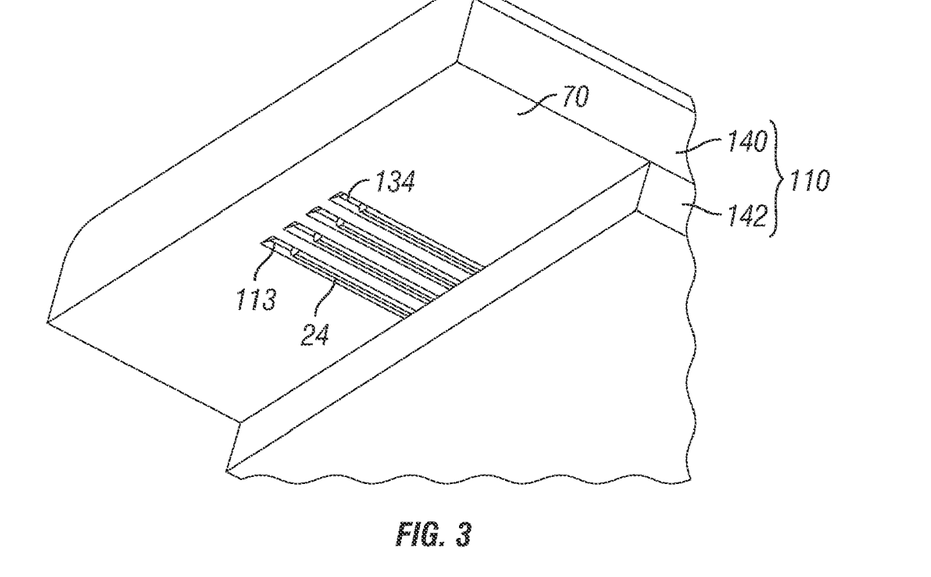
FIG. 3 is an enlarged perspective view of the extended portion of the optical bench, in accordance with one embodiment of the present invention.

FIGS. 3 to 6 illustrate an embodiment of an optical coupling device in the form of an optical connector 110 adopting the inventive concept illustrated in FIG. 2. The optical connector 110 includes an optical bench in the form of a ferrule 140, and a cover 142. The ferrule 142 has a portion 70 that extends beyond the adjacent end of the cover 142. The ferrule 142 is provided with fiber alignment grooves 134 that extend beyond the edge of the cover to the extended portion 70. Each groove 134 terminates in a structured reflective surface 113 located beyond the adjacent edge of the cover 142. Each optical fiber 124 extends in the groove 134 to beyond the edge of the cover 142, to closer to the structured reflective surface 113. For simplicity, FIG. 3 illustrates a partial view of the optical connector 110, with an enlarged view of the extended portion 70. The overall optical connector 110 is illustrated in FIG. 6.

Figure 4:
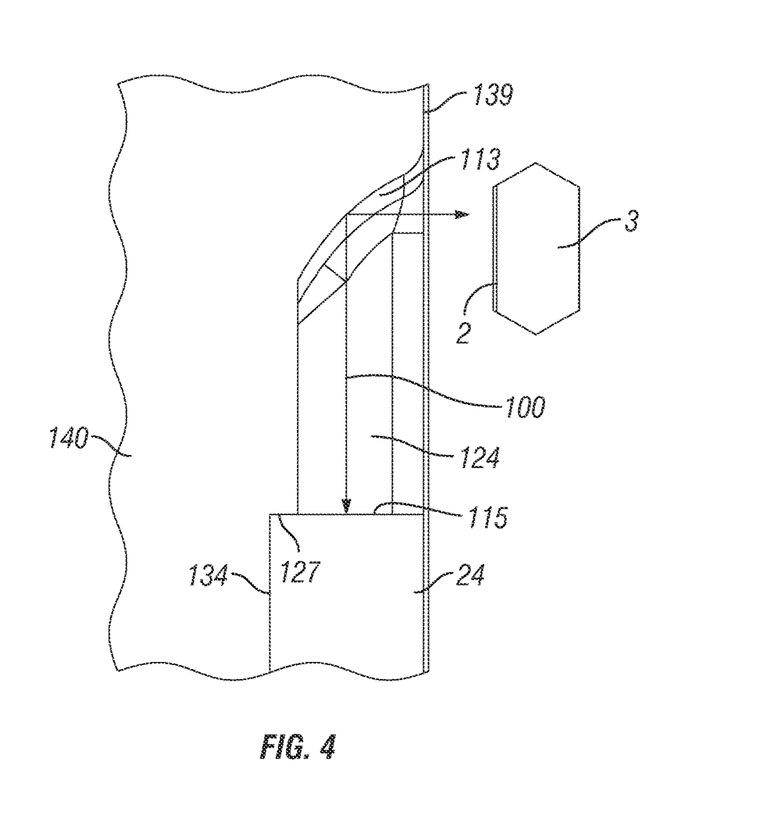
FIG. 4 is a sectional view of the fiber alignment groove along a longitudinal axis of the optical fiber.
Figure 5:
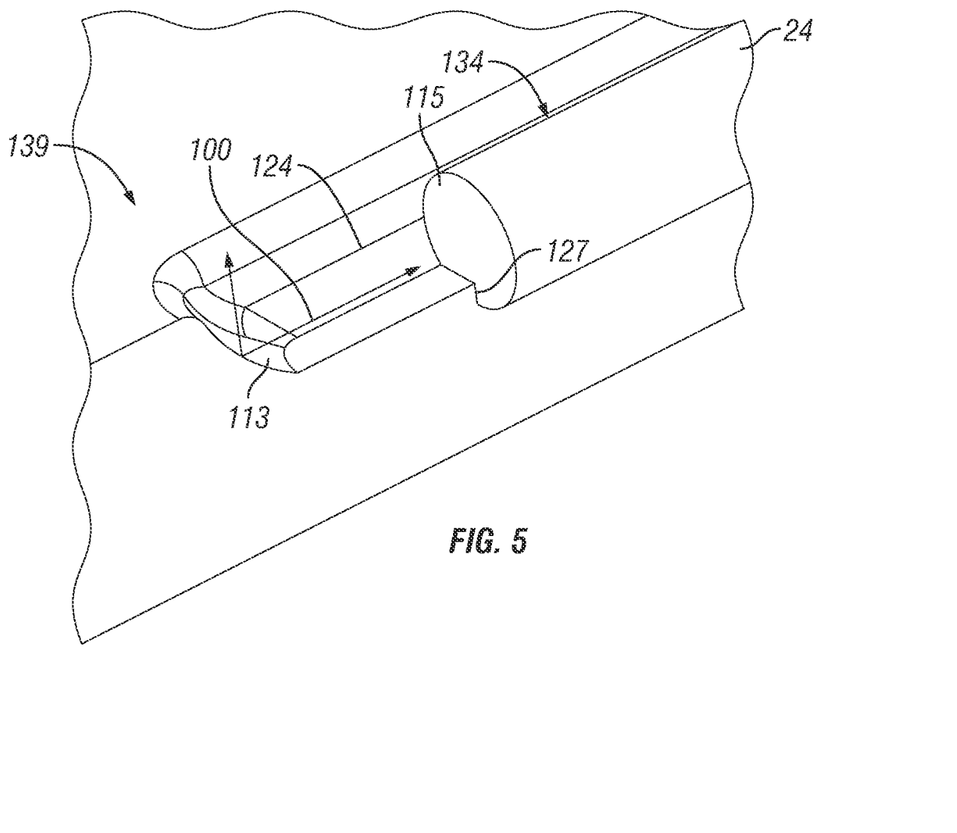
FIG. 5 is a perspective sectional view of FIG. 4.

FIG. 4 is a sectional view taken along a longitudinal axis of the optical fiber 24. FIG. 5 is a perspective section view taken along the longitudinal axis of the optical fiber 24. In the illustrated embodiment, the fiber alignment structure is in the form of open groove 134 positively receives the bare end section of the optical fiber 24 in a manner with the end of the optical fiber 24 at a defined distance to and aligned with the structured reflective surface 113. The open groove 134 includes a generally U-shaped cross-section that snugly receive the bare optical fiber 24. The location and orientation of the structured reflective surface 113 is fixed in relation to the fiber alignment groove 134. In the illustrated embodiment, the groove 134 and the structured reflective surface 113 are defined on the same (e.g., monolithic) ferrule 140. The groove 134 has a section 124 defining a space between the end face 115 of the optical fiber 24 and the structured reflective surface 113. In the illustrated embodiment, this section 124 has a similar width but a shallower bottom as the remaining sections of the groove 134. The section 124 defines a shoulder 127 that provides a stop against which a portion of the edge of the end face 115 of the optical fiber 24 is butted. Accordingly, a distance along the optical axis is defined between the end face 115 and the structured reflective surface 113. In the illustrated embodiment, the optical fiber is completely received in the groove 134, with the exterior surface of the optical fiber 24 flush with the top surface 139 of the ferrule 140. Light is turned between the PIC 3 and the optical fiber 24, along an optical path 100.

FIG. 6 is a sectional view illustrating one embodiment of configuring the optical connector 110 with respect to the grating coupler 2 on the PIC 3. The optical connector 110 is attached through the opening 121 in the base 116 of the housing 114 of an opto-electronic module 112, with the extended portion 70 within the module housing 114. The structured reflective surface 113 is in optical alignment with the grating coupler 2 on the PIC 3. FIG. 6 illustrates the reflection of light between optical fiber 24 and the grating coupler 2 via the structured reflective surface 113 at the extended portion 70, which is a concave reflective surface.

The optical connector 110 may be deemed to function as a hermetic feedthrough with built-in optics and an alignment ferrule for the optic fiber ribbon 23, eliminating the need for separate optical elements for optical coupling with the grating coupler 2 on the PIC 3 in the opto-electronic module 112.

The structured reflective surface 113 and the alignment grooves 134 may be formed integrally by precision stamping the optical bench (i.e., ferrule 140) out of a malleable metal material. The design and stamping of the structured reflective surface may involve considerations similar to those disclosed in nanoPrecision's earlier patent documents noted above, and further modified to provide the desired optical coupling between the optical fiber and the grating coupler on the PIC. For example, a precision stamping process and apparatus has been disclosed in U.S. Pat. No. 7,343,770, which was commonly assigned to the assignee of the present invention. This patent is fully incorporated by reference as if fully set forth herein. The process and stamping apparatus disclosed therein may be adapted to precision stamping the features of the ferrule 140 and/or cover 142 of the present invention (including the structured reflective surfaces and optical fiber alignment grooves). The stamping process and system can produce parts with a tolerance of less (better) than 1000 nm.

The external surfaces of the optical connector 110 could be maintained at high tolerance as well for alignment using an alignment sleeve. In the embodiments described above, no alignment pin is required for alignment of the ferrules to the housing 114. Accordingly, for stamping of the ferrule portions (ferrules and covers), that would include stamping the entire body of the ferrule portions, including forming the grooves, mating surfaces of the ferrule portions, and external surfaces that come into contact with sleeves, or in the case of FIG. 6, with the opening in the housing 114. This maintains the required dimensional relationship between the groove 134 and external alignment surfaces of the optical connector 110, to facilitate alignment, e.g., without relying on alignment pins.

In all the above described embodiments, the structured reflective surface 113 may be configured to be flat, concave or convex, or a combination of such to structure a compound reflective surface. In one embodiment, the structured reflective surface has a smooth (having a finish resembling a polished finish) mirror surface. It may instead be a textured surface that is reflective. The structured reflective surface may have a uniform surface characteristic, or varying surface characteristics, such as varying degree of smoothness and/or textures across the surface, or a combination of various regions of smooth and textured surfaces making up the structured reflective surface. The structured reflective surface may have a surface profile and/or optical characteristic corresponding to at least one of the following equivalent optical element: mirror, focusing lens, diverging lens, diffraction grating, or a combination of the foregoing. The structure reflective surface may have a compound profile defining more than one region corresponding to a different equivalent optical element (e.g., a central region that is focusing surrounded by an annular region that is diverging). In one embodiment, the structured reflective surface is defined on an opaque material that does not transmit light through the surface.

The optical connector 110 in accordance with the present invention overcomes many of the deficiencies of the prior art, which provides precision alignment, high reliability against environmental conditions, and which can be fabricated at low cost. The inventive connector assembly may be configured to support a single or multiple fibers, for optical alignment and/or hermetic feedthrough that may include integral optical elements.

In a further aspect of the present invention, the structured reflective surface of the mirror 12 and structured reflective surface 113 are configured to reshape light to produce a mode field that matches the optical fiber input/output and the design angle of a target grating coupler. In one embodiment, the mirror 12/structure reflective surface 113 is configured to reshape light input/output of an optical fiber having a flat polished end (i.e., end face in a plane perpendicular to the fiber axis), to produce a mode field resembling the mode field of an angled polished butt-coupled optical fiber, so as to match the design angle of existing grating couplers that are designed to work with angled-polished butt-coupled optical fibers. This backward compatible approach would not require new grating couplers to be developed.

Below are further design considerations and features of the inventive concept of adopting stamped mirrors for coupling to grating of PIC (e.g., silicon PIC or SiPIC's). The mirrors may be stamped into metallic sheet, metallic foil, bulk metal specific to the application. Various malleable metals, stampable with tool steels or tungsten carbide tools may compose the body of the mirror, including any 300 or 400 series stainless steel, any composition of Kovar, any precipitation or solution hardened metal, and any alloy of Ag, Al, Au, Cu. At the long wavelengths above 1310 nm, aluminum is highly reflective (>98%) and economically shaped by stamping. The reflective surface of the portion of the metal comprising the mirror may be any of the metals mentioned above, or any coating of highly reflective metal, applied by sputtering, evaporation, or plating process.

The mirror surface, to provide optical power, may have a surface geometrical curvature function of any of the following, individually, or in superposition: ellipsoidal or hyperbolic conic foci, toroidal aspheric surfaces with various number of even or odd aspheric terms, X-Y aspheric curves with various number of even or off terms, Zernike polynomials to various order, and various families of simpler surfaces encompassed by these functions. The surfaces may also be free-form surfaces with no symmetry along any plane or vector.

The fiber alignment grooves are formed with high precision with respect to the mirrors. The mirrors may be designed to operate for various type of sources, including multimode (MM) and single mode (SM) fiber, MINI and SM VCSEL's at various wavelength, and for broadband sources as well. The mirrors may be designed to operate in various transmissive medium, including air, glass, index matching epoxy, plastic, and any combination of the above.

The focal length range of the mirrors may be anywhere from 50 to 5000 microns.

The mirrors' F- number (focal length to clear aperture ratio) may be any physically realizable value.

Below are preferred embodiments for SM fiber to SiPIC coupling:
a. Mirrors are stamped in sheet metal 0.5 to 10 mm in thickness.
b. For SM fiber coupling at 1310, 1490 nm, 1550 nm wavelengths, the material of choice is aluminum for the reflective surface.
c. The mirror surface, to provide optical power, is an ellipsoid (conic foci).
d. The focal length of the mirror surface is between 300 microns and 2000 microns.
e. The mirrors' maximum clear aperture diameter is less than 100 microns to 500 microns.
f. The mirrors are designed for operation in air or index matching epoxy.
g. The angle of operation with respect to the grating coupler normal is +/−20 degrees.
h. Operation is in air or index matching epoxy.
i. Mirrors reproduce the field exiting from flat polished fiber tilted at the design angle.
j. The mirrors can be coated with a high-reflectivity coating (gold, dielectric reflectors, etc.) to improve the inherent reflectivity of the mirror material.

The optical performance of the connection depends upon the quality of the stamped optic (form and surface finish) and the position and orientation of the fiber-mirror-grating coupler. The body that holds the reflective optic should be made of a material that has a coefficient of expansion (CTE) that is closely matched to the PIC material. For instance, Kovar is closely matched to silicon. This CTE match minimizes thermally induced misalignment in the optical path and thermo-mechanical stress that can result from thermal expansion.

If the stamped mirror surface is too rough, light can be scattered. Some of the scattered light may bounce around and end up being connected into a neighboring fiber, which would cause cross-talk. In accordance with the present invention, the compression of the malleable material (e.g., Aluminum, Silver, Copper or Gold) between the punch and die during stamping operation(s) generates high contact pressure for a high reflective, mirror-quality surface. Initial experiments on stamped mirrors demonstrated high coupling efficiencies around 89% (0.5 db) or higher.

The commercial use of the present invention includes connecting optical fibers to PICs for data communication. In this application, the PICs might be transceivers which convert digital electrical signals into digital optical signals. Another possible application may be within optical switches which route digital optical signals between multiple ports. A further application might be sensors that use light for transduction (e.g. electro-optical MEMS accelerometer). Another application might be optical sensing for bio-molecular detection or gas molecule detection.

While the above-described embodiments referred to a single optical fiber connected to single grating coupler via a single mirror (FIG. 2), and a 1D array of optical fibers connected to a 1D array of grating couplers via a 1D array of mirrors (FIG. 3), 2D array of optical fibers connected to a 2D array of grating couplers via a 2D array of mirrors can be implemented by adopting the concept of the present invention. Further, other than the optical paths discussed above, optical paths having different shapes can be produced by configuring the structured reflective surface with different reflective geometries.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. An optical coupling between an optical fiber and a grating coupler, having a design angle, of a photonic integrated circuit (PIC), comprising:
a stamped optical bench comprising a stamped structured reflective surface, wherein the structured reflective surface is an exposed free surface of the optical bench at which incident light is directed, wherein the stamped optical bench supports the optical fiber in optical alignment with respect to the structured reflective surface, wherein the optical fiber is a single-mode fiber, wherein the structured reflective surface turns light transmitted between the grating coupler and the optical fiber, and wherein the structured reflective surface includes a reflective surface profile that is structured to reshape the light transmitted between the grating coupler and the optical fiber to produce a mode field that matches the optical fiber input/output and the design angle of the grating coupler,
wherein the structured reflective surface comprises a three-dimensional concave reflective ellipsoidal surface profile.

2. The optical coupling as in claim 1, wherein the optical fiber is a flat polished optical fiber having an end face that is substantially perpendicular to a longitudinal axis of the optical fiber, and wherein the structured reflective surface is configured to reshape the light transmitted between the grating coupler and the input/output of the flat polished optical fiber, to produce the mode field resembling a mode field of an angled polished optical fiber, so as to match the flat polished optical fiber to a design angle of an existing grating coupler that is designed to work with the angled polished optical fiber.

3. The optical coupling as in claim 2, wherein the optical bench further comprising a fiber alignment structure for aligning the optical fiber to the structured reflective surface, wherein the structured reflective surface and the fiber alignment structure are integrally/simultaneously formed by precision stamping a malleable metal body.

4. The optical coupling as in claim 1, wherein the concave reflective surface profile is structured to reshape light to produce the mode field that matches the optical fiber input/output and the design angle of the grating coupler without relying on a refractive optical element between the input/output of the optical fiber and the grating coupler.

5. The optical coupling as in claim 1, wherein the concave reflective surface profile is structured to reshape light to produce the mode field that matches the optical fiber input/output and the design angle of the grating coupler without relying on a refractive optical element between the input/output of the optical fiber and the structured reflective surface.

6. The optical coupling as in claim 1, wherein the concave reflective surface profile is structured to reshape light to produce the mode field that matches the optical fiber input/output and the design angle of the grating coupler without relying on a refractive optical element between the structured reflective surface and the grating coupler.

7. The optical coupling as in claim 1, wherein the concave reflective surface profile is curved as viewed in two orthogonal planes that each includes a longitudinal axis of the optical fiber.

8. A method of optically coupling an optical fiber to a grating coupler, having a design angle, of a photonic integrated circuit (PIC), comprising:
providing a stamped metal optical bench comprising a stamped structured reflective surface and a stamped fiber alignment feature, wherein the structured reflective surface is an exposed free surface of the optical bench at which incident light is directed, wherein the stamped fiber alignment feature of the optical bench supports an optical fiber in optical alignment with respect to the structured reflective surface, wherein the optical fiber is a single-mode fiber, wherein the structured reflective surface turns light transmitted between the grating coupler and the optical fiber, and wherein the structured reflective surface includes a reflective surface profile that is structured to reshape the light transmitted between the grating coupler and the optical fiber to produce a mode field that matches the optical fiber input/output and the design angle of the grating coupler,
wherein the structured reflective surface comprises a three-dimensional concave reflective ellipsoidal surface profile.

9. The method as in claim 8, wherein the optical fiber is a flat polished optical fiber having an end face that is substantially perpendicular to a longitudinal axis of the optical fiber, and wherein the structured reflective surface is configured to reshape light input/output of the flat polished optical fiber, to produce the mode field resembling a mode field of an angled polished optical fiber, so as to match the flat polished optical fiber to a design angle of an existing grating coupler that is designed to work with the angled polished optical fiber.

10. The method as in claim 9, wherein the structured reflective surface and the fiber alignment structure are integrally/simultaneous formed by precision stamping a monolithic malleable metal body.

11. The method as in claim 8, wherein the concave reflective surface profile is structured to reshape light to produce the mode field that matches the optical fiber input/output and the design angle of the grating coupler without relying on a refractive optical element between the input/output of the optical fiber and the grating coupler.

12. The method as in claim 8, wherein the concave reflective surface profile is structured to reshape light to produce the mode field that matches the optical fiber input/output and the design angle of the grating coupler without relying on a refractive optical element between the input/output of the optical fiber and the structured reflective surface.

13. The method as in claim 8, wherein the concave reflective surface profile is structured to reshape light to produce the mode field that matches the optical fiber input/output and the design angle of the grating coupler without relying on a refractive optical element between the structured reflective surface and the grating coupler.

14. The method as in claim 8, wherein the concave reflective surface profile is curved as viewed in two orthogonal planes that each includes a longitudinal axis of the optical fiber.

15. The optical coupling as in claim 1, wherein an index matching epoxy is disposed between the structured reflective surface and the optical fiber.

16. The method as in claim 8, further comprising disposing an index matching epoxy between the structured reflective surface and the optical fiber.

17. An optical coupling between a plurality of optical fibers and a grating coupler, having a design angle, of a photonic integrated circuit (PIC), comprising:
a stamped optical bench comprising a plurality of stamped structured reflective surfaces each corresponding to a different one of the plurality of optical fibers, wherein each structured reflective surface is an exposed free surface of the optical bench at which incident light is directed, wherein the optical bench supports each optical fiber in optical alignment with respect to the corresponding structured reflective surface, wherein each structured reflective surface turns light transmitted between the grating coupler and the corresponding optical fiber, wherein each optical fiber is a single-mode fiber, and wherein each structured reflective surface includes a reflective surface profile that is structured to reshape the light transmitted between the grating coupler and the corresponding optical fiber to produce a mode field that matches the corresponding optical fiber input/output and the design angle of the grating coupler,
wherein each structured reflective surface comprises a three-dimensional concave reflective ellipsoidal surface profile, and
wherein the optical bench further comprises a plurality of fiber alignment structures for aligning each optical fiber to the corresponding structured reflective surface, wherein the plurality of structured reflective surfaces and the fiber alignment structures are integrally/simultaneously formed by precision stamping a malleable metal body.

18. The optical coupling as in claim 1, wherein the grating coupler outputs light at the design angle of the grating coupler, which is transmitted to the optical fiber via the structured reflective surface, and wherein the structured reflective surface reshapes the light from the grating coupler to produce the mode field that matches the optical fiber input.

19. The method as in claim 8, wherein the grating coupler outputs light at the design angle of the grating coupler, which is transmitted to the optical fiber via the structured reflective surface, and wherein the structured reflective surface reshapes the light from the grating coupler to produce the mode field that matches the corresponding optical fiber input.

20. The optical coupling as in claim 17, wherein the grating coupler outputs light at the design angle of the grating coupler, which is transmitted to the corresponding optical fiber via the corresponding structured reflective surface, and wherein the corresponding structured reflective surface reshapes the light from the grating coupler to produce the mode field that matches the corresponding optical fiber input.

* * * * *